July 31, 1951 — C. E. ELLIOTT — 2,562,380

HAND OPERATED BEATER AND MIXER

Filed March 15, 1947

INVENTOR.
Clarence E. Elliott

BY
ATTORNEY.

Patented July 31, 1951

2,562,380

UNITED STATES PATENT OFFICE 2,562,380

HAND-OPERATED BEATER AND MIXER

Clarence E. Elliott, Kansas City, Kans.

Application March 15, 1947, Serial No. 734,909

3 Claims. (Cl. 259—131)

This invention relates to manually operable kitchen utensils for beating and mixing foods or the like, and has for its primary object the provision of a device of such character that is more easily handled, more efficient in operation, and more sturdily constructed than the conventional hand operated beater.

The most important object of this invention is to provide a hand operated beater and mixer having a pair of shafts for supporting the beater elements, journalled for rotation in a pair of spaced-apart bearings disposed in a frame at a point remote from said beater element.

Another important object of this invention is to provide a beater having a frame provided with two pairs of spaced bearings for rotatably supporting shafts for the beater elements near one end of the shafts opposite to the beater elements and having a gear and crank assembly rotatably mounted in the frame between the bearings.

A further important object of this invention is the provision of a mixer having a pair of spaced apart shafts, each having a pinion on one end thereof and a gear interposed between the pinions for simultaneously imparting rotative motion to the shafts as the gear is manually rotated.

Another object of this invention is to provide a mixer including a frame having spaced bearings for rotatably supporting a pair of shafts and a gear and crank assembly, with the gear interposed between the shafts and between the bearings and the crank intersecting the shafts at a point substantially midway between the bearings.

A further object of this invention is the provision of a beater having a guard member depending from the frame and in circumscribing relation to the beater head to maintain the head out of contact with the bottom of the mixing bowl as well as the sides thereof in one direction.

A still further object of this invention is to provide a beater having a pair of intermeshing beater elements each formed from a pair of wire loops in intersecting relation and each loop being provided with a pair of opposed curls all to the end that a thorough mixing of ingredients is attained when the beater is placed in operative use.

Many minor objects will be made clear or become apparent during the course of the following specification, reference being had to the accompanying drawing wherein.

Figure 1:
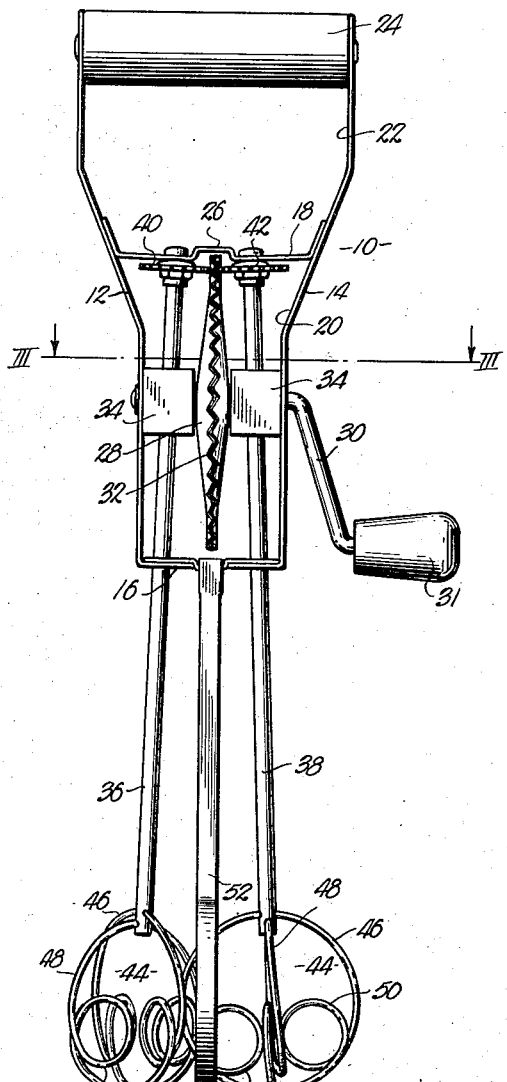
Fig. 1 is a front elevational view of a hand operated beater and mixer made in accordance with my present invention.

In the drawing the numeral 10 designates broadly a frame that is substantially U-shaped and comprising a pair of legs 12 and 14, a bight 16 and a partition 18. Partition 18 and bight 16 define a pair of spaced cross members interconnecting legs 12 and 14 of frame 10 and set off an enclosure 20. A second enclosure 22 for the hand of the operator is created by partition 18, a portion of the legs 12 and 14 and a handle 24 joining legs 12 and 14 and spanning the distance therebetween in opposed relation to the bight 16 of frame 10.

Partition 18 is centrally offset inwardly into enclosure 22 as at 26 to receive a circular base gear 28, which gear is axially supported by one leg of a crank 30 having a knob 31 thereon. Gear 28 comprises a pair of complementary discs as clearly shown in Figs. 1 and 3, fused or otherwise secured together in face-to-face relation. Cogs 32 are formed in the gear 28 by crimping the marginal edge thereof through its periphery and aligned central openings are formed in the discs for receiving the crank 30, which is secured to the gear 28 in any suitable manner (not shown).

The diameter of the gear 28 is slightly less than the distance between the offset portion 26 of the cross member 18 and the cross member 16 of frame 10. Gear 28 is disposed within the enclosure 20 in intersecting relation to a plane through the legs 12 and 14 of frame 10 and held substantially midway therebetween by a pair of spacers 34, fused or otherwise secured, one each to the inner faces of legs 12 and 14.

Each of the spacers 34 as well as the legs 12 and 14 is provided with openings in alignment respectively for rotatably receiving portions of the crank 30 extending laterally from outer face of the gear 28.

Each of the cross members 16 and 20 is provided with bearings for rotatably receiving a pair of spaced apart shafts 36 and 38. It is notable that the bearings in member 16 of frame 10 are spaced a greater distance than the bearings of member 18 to the end that the shafts 36 converge as the uppermost ends thereof are approached.

Each of the shafts 36 and 38 carries a pinion 40 and 42 respectively near the said uppermost ends thereof, held in enmeshing relation with the face cogs 32 of gear 28 on opposite faces thereof by the bearings formed in the members 16 and 18. These pinions 40 and 42 are each disposed within enclosure 20 immediately below and in underlying relation to the partition member 18 and the ends of shafts 36 and 38 projecting through the bearings in member 18 are enlarged as illustrated in Fig. 1 to prevent longitudinal movement of shafts 36 and 38 within member 18.

Figure 2:
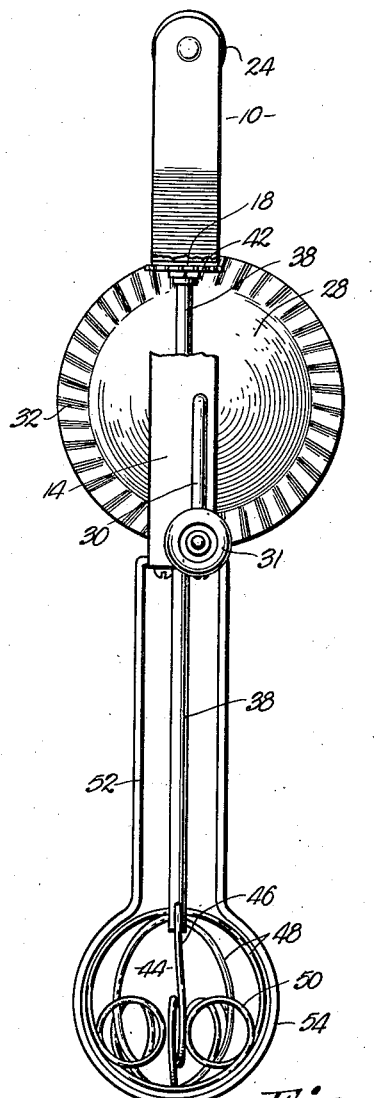
Fig. 2 is a side elevational view thereof, parts being broken away for clearness.
Figure 3:
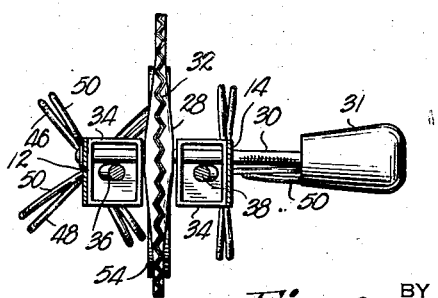
Fig. 3 is a cross sectional view taken on line III—III of Fig. 1, looking in the direction of the arrows.

Shafts 36 and 38 are journalled in the bearings within member 16 intermediate the ends thereof to present portions entirely within enclosure 20. It is notable that gear 28 is disposed between these portions of shafts 36 and 38 and that the crank 30 intersects these portions to one side thereof as illustrated in Fig. 3. This figure also shows the hollow nature of the spacers 34 and the manner in which they receive the shafts 36 and 38. It is to be noted further, as shown in Fig. 2, that gear 28 extends outwardly a greater distance beyond one side of frame 10 than the other side, and that the shafts 36 and 38 intersect gear 28 to one side of center. Therefore, the cogs 32 are formed in gear 28 by crimping the same at an angle with respect to its radius.

The ends of the shafts 36 and 38 opposite to pinions 40 and 42 are disposed a distance beyond member 16 of frame 10 and each carry a beater head 44 thereon. These heads 44 are identical and intermesh on a central plane between shafts 36 and 38. The heads 44 each comprise a pair of loops 46 and 48, preferably of wire, disposed in intersecting, substantially perpendicular relationship.

A pair of openings are formed in each of the shafts 36 and 38 at right angles to each other for receiving the loops 46 and 48, the opening receiving loop 46 being spaced from the proximal end of the respective shaft 36 or 38 a greater distance than the other opening for receiving loop 48. These loops 46 and 48 are fused to the shafts 36 and 38 respectively and to each other at the point of crossing outwardly from shafts 36 and 38.

A pair of opposed curls 50 are formed in each of the loops 46 and 48, one on each side of a line through the longitudinal axis of the shaft 36 or 38. These curls 50 each constitute one convolution of a coil and project inwardly toward each other within the area defined by the substantially circular loops 46 or 48. Furthermore, the curls 50 extend outwardly in opposite directions to each side of a plane through the loops 46 and 48.

The peculiar shape and construction of the beater heads 44 and particularly the design and disposition of curls 50 is highly important in accomplishing one of the aforesaid objects of this invention. It is to be noted that curls 50 are all disposed at the outermost end of the heads 44, or entirely to one side of the transverse axis of the heads 44. When placed in operation, this beater will tend to draw the ingredients within a bowl downwardly along the sides of the bowl and elevate the same along the longitudinal axis of the beater. This action is exactly opposite to that which takes place when the usual type of beater is used and affords complete admixing of the ingredients being treated as well as providing a better beating action. When the usual type of beater is utilized, whipping and beating action takes place upon the ingredients only within an area closely adjacent and circumscribing the beaters. When a beater having heads 44 as a part thereof is placed in operation, the mixture circumscribing the heads 44 in spaced relation thereto is also treated since these heads 44, through the action of curls 50 thereof draw this outermost layer of the mixture downwardly and inwardly into the heads 44 and thence directs the same inwardly and upwardly toward the longitudinal axis of the beater.

In addition to the feature of having the supporting bearings for the shafts 36 and 38 disposed at a point remote from the beater heads 44, to the end that no interference with the action of heads 44 is experienced, a guard member 52 is provided. This guard member 52 constitutes a closed loop depending from the frame 10 and secured to the member 16 thereof by its screws or the like. Guard member 52 is disposed on a substantially central plane through the gear 28 and approximately midway between the shafts 36 and 38. This member 52 is substantially perpendicular to the shafts 36 and 38 and includes a circular portion 54 at that end thereof remote from the frame 10 for circumscribing both the beater heads 44 at their point of intermeshing relationship. This portion 54 of member 52 extends slightly beyond the outermost ends of the beater heads 44, to the end that when the beater is placed in a bowl or the like containing the ingredients to be treated, a firm resting point is established between the beater and the bottom of such bowl.

Furthermore, this portion 54 serves to protect the heads 44 against striking the sides of the bowl in one direction while the operator has complete control in the other direction through the medium of gripping handle 24 with one hand and the knob 31 with the other hand.

When the beater just described is placed in operation, it may be used in a vertical position or in any position approaching the horizontal. During such shift of positions, the rounded portion 54 of member 52 will maintain the heads 44 out of contact with the pan or bowl used and facilitate such bodily movement of the beater. Tipping of the beater upon the portion 54 in either direction when the same is near horizontal will cause "picking up" of virtually all the ingredients in the pan.

It is to be noted that when the beater is tipped toward the user, the shafts 36 and 38 will rotate in a direction to rotate the heads 44 upwardly, thus raising the mixture in the pan rather than beating the same downwardly as is the usual practice.

The pinions 40 and 42 being disposed at the uppermost end of the gear 28 provides for such correct direction of rotation of shaft 36 and 38 and these pinions being disposed one on each side of gear 28 presents a direct drive for each shaft 36 and 38. Thus no skipping takes place as is true when beaters are made having one pinion driven from the other.

Many advantages will arise through employment of the hand operated beater and mixer forming the subject matter of this application and while only one modification thereof has been illustrated and described, it is understood that many changes may be made, particularly in detail of construction without departing from the spirit of this invention or scope of the appended claims.

Having described the invention, what is claimed as new and desired to be secured by Letters Patent is:

1. A beater and mixer comprising a frame; a pair of spaced shafts rotatably carried by said frame and extending outwardly therebeyond, said shafts diverging as the outermost ends thereof subjacent the frame are approached; a beater head carried by each shaft respectively at said outermost end thereof; a pinion on each shaft respectively adjacent the opposite end thereof; and a gear rotatably carried by the frame in mesh with said pinions for rotating the beater heads through the pinions and the shafts, said gear extending between the shafts and pinions, having its axis of rotation in transverse, offset relationship to the axes of rotation of the shafts and being disposed between the pinions and the beater heads, whereby as the latter tend to separate in response to the rising and passing therebetween of material being mixed, said pinions are moved toward each other into tight engagement with the gear.

2. A beater and mixer comprising an enclosed frame having a pair of opposed sides and a pair of opposed ends, one end of the frame forming a handle; a partition member joining the sides of said frame; a pair of spaced beater shafts journalled for rotation in said partition member and in the end of the frame opposite said handle, said shafts extending outwardly beyond said end of the frame opposite said handle and diverging as the outermost ends thereof are approached; a pinion on each shaft respectively near the partition member and on one side of the latter subjacent said handle; a crank shaft joining the sides of said frame and rotatable therein, said crank shaft being between the partition member and said end of the frame opposite said handle in parallelism therewith on one side of the beater shafts; and a gear secured to the crank shaft between the sides of the frame, between the beater shafts, between the partition member and the end of the frame opposite said handle, and between said pinions in mesh with the latter.

3. A beater and mixer comprising an enclosed frame having a pair of opposed sides and a pair of opposed ends, one end of the frame forming a handle; a partition member joining the sides of said frame; a pair of spaced beater shafts journalled for rotation in said partition member and in the end of the frame opposite said handle, said shafts extending outwardly beyond said end of the frame opposite said handle and diverging as the outermost ends thereof are approached; a pinion on each shaft respectively near the partition member and on one side of the latter subjacent said handle; a crank shaft joining the sides of said frame and rotatable therein, said crank shaft being between the partition member and said end of the frame opposite said handle in parallelism therewith on one side of the beater shafts; a gear secured to the crank shaft between the sides of the frame, between the beater shafts, between the partition member and the end of the frame opposite said handle, and between said pinions in mesh with the latter; and a spacer between the gear and each side of the frame respectively and secured to the latter for holding the gear centered between the pinions, said spacers journalling the crank shaft and a corresponding beater shaft.

CLARENCE E. ELLIOTT.

REFERENCES CITED

The following references are of record in the file of this patent:

UNITED STATES PATENTS

| Number | Name | Date |
|---|---|---|
| 177,574 | Seymour | May 16, 1876 |
| 1,101,781 | Bleuler | June 30, 1914 |
| 1,702,862 | Byland | Feb. 19, 1929 |
| 1,968,502 | Nordby et al. | July 31, 1934 |
| 1,992,654 | Elliott | Feb. 26, 1935 |
| 2,193,461 | Lienhard | Mar. 12, 1940 |
| 2,243,443 | Sette | May 27, 1941 |